United States Patent Office 3,490,542
Patented Jan. 20, 1970

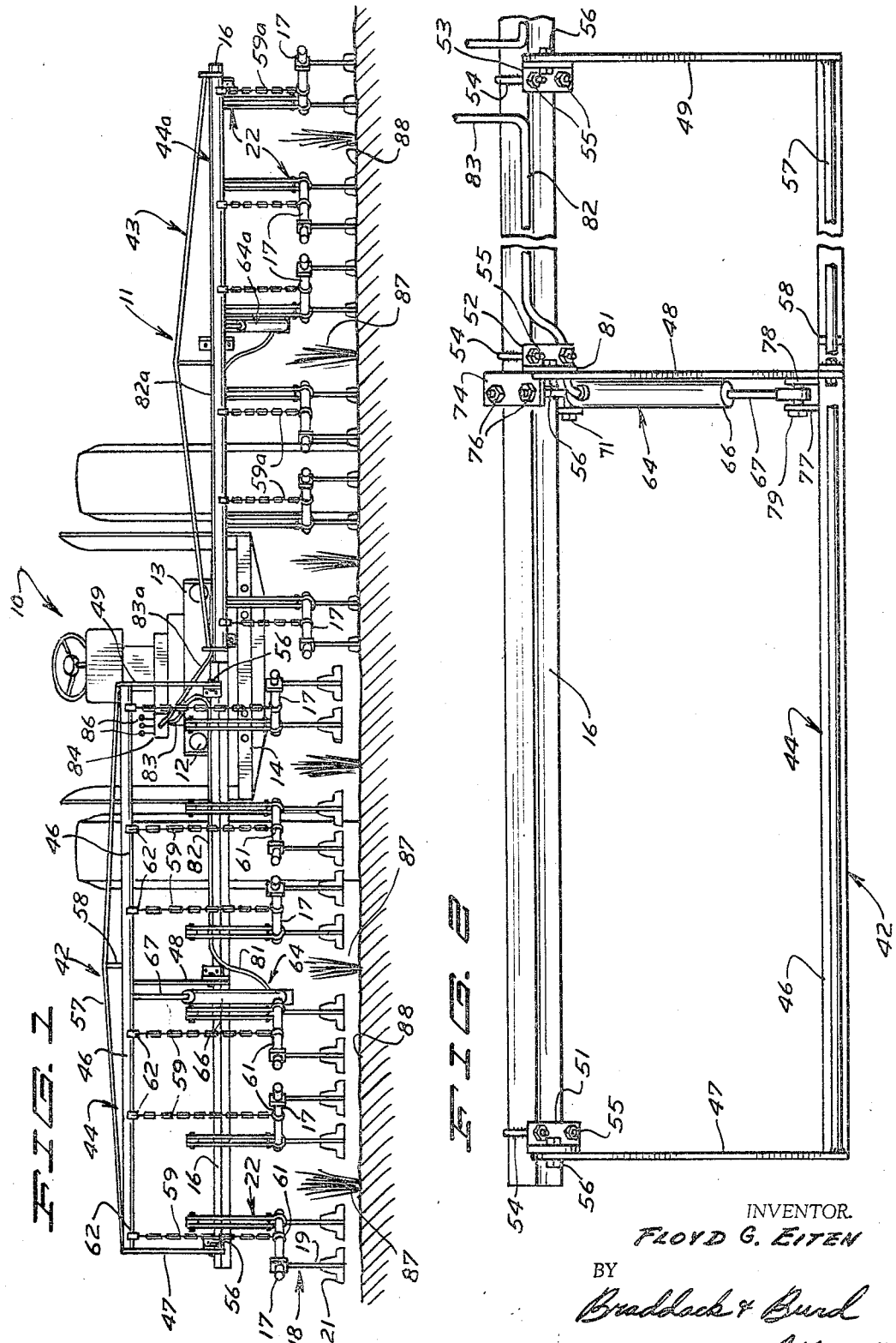

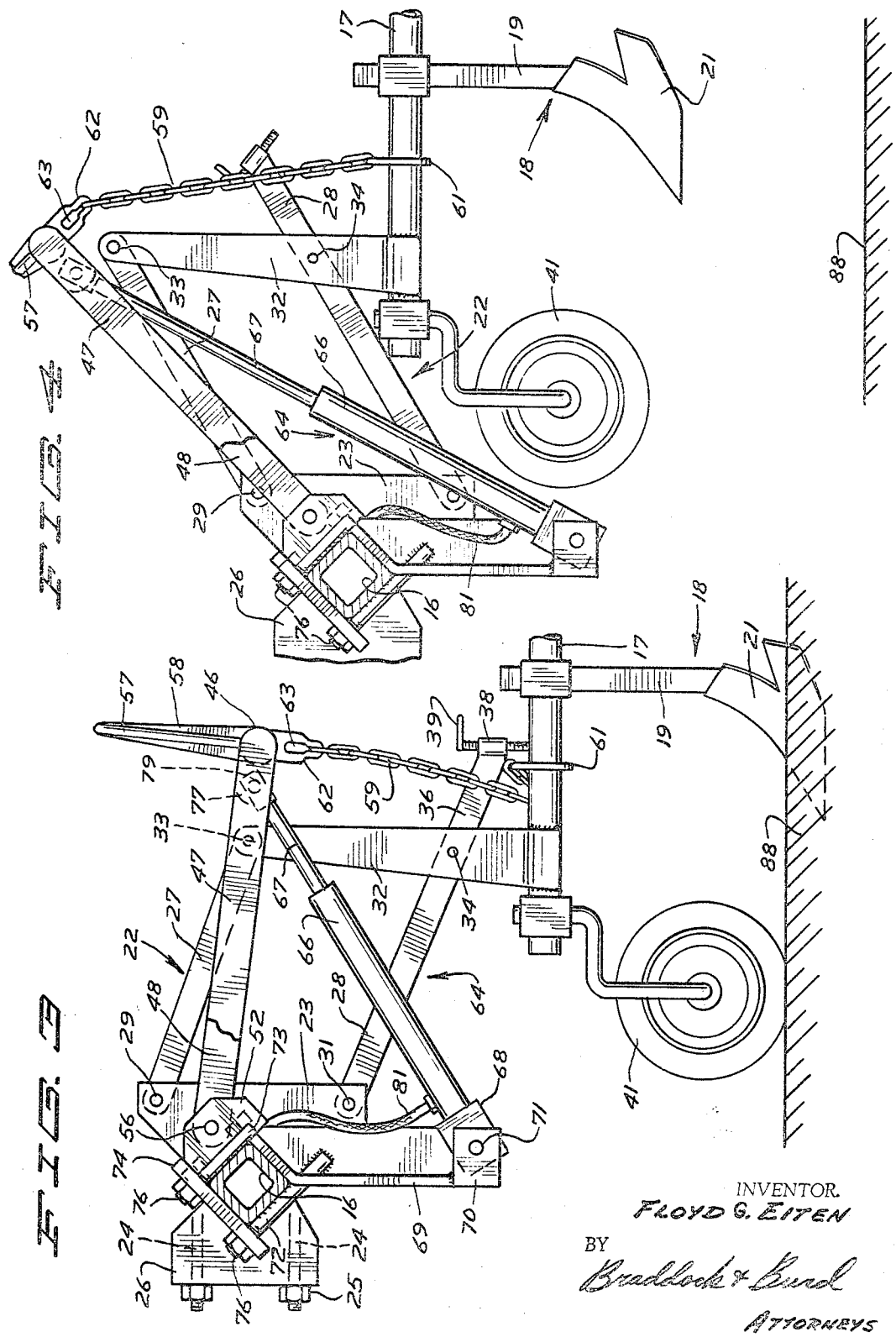

3,490,542
POWER LIFT FOR TOOL BAR CULTIVATOR
Floyd G. Eiten, Wellsburg, Iowa 50680
Continuation of application Ser. No. 511,809, Dec. 6, 1965. This application Jan. 30, 1969, Ser. No. 797,724
Int. Cl. A01b 35/10, 63/102, 63/111
U.S. Cl. 172—470    6 Claims

ABSTRACT OF THE DISCLOSURE

A multiple row tool bar cultivator mounted on the lift arms of a tractor. A pair of frames pivotally mounted on the tool bar are attached to earth working tool gangs with flexible links. Separate hydraulic cylinders connected to the tool bar and each frame operate to selectively raise the frames and the connected gangs.

SUMMARY OF INVENTION

This application is a continuation of U.S. application Ser. No. 511,809 filed Dec. 6, 1965.

This invention relates to an earth working implement and more particularly to a rear mounted cultivator having a transverse tool bar which is raised and lowered with the lift arms of the tractor in combination with separate lift units operable to selectively raise and lower oppositely positioned ground working tools.

Numerous earth working implements have been designed to cultivate row crops as corn, soybeans, cotton and the like. A recent innovation of these earth working implements is the rear mounted cultivator adapted to be detachably connected to the three point hitch of a farm tractor. These rear mounted cultivators are wide implements designed to simultaneously till the strips of soil between four to eight rows. This is achieved with a transversely positioned tool bar coupled to the lift of the tractor. A plurality of earth working tools connected to the tool bar are raised and lowered along with the tool bar.

With improved agricultural practice soil conservation practices almost every cultivated field has grass waterways and in many places contour strips. In cultivating these fields with a rear mounted cultivator it is desirable to selectively raise either the right section or the left section of the cultivator as it passes over the grass waterways. At times it is desirable to raise the entire cultivator depending on the location of the waterway in the field. The auxiliary power lift units of this invention are operable to selectively raise either the right section or the left section of a rear mounted cultivator as well as being operable to concurrently raise both sections of the rear mounted cultivator without changing the position of the transverse tool bar.

In cultivating tall plants, as corn and cotton, it is an agricultural practice to cultivate the plants in advance stages of growth. For example, corn is cultivated when it is 3 to 4 feet high. With corn of this height the cultivator tool bar, gangs, gauge wheels and shovels damage major amounts of the corn at the ends of the rows in the turning of the tractor. The raised lift arms do not provide the rear mounted cultivator with sufficient crop clearance to avoid extensive crop damage. The auxiliary lift of this invention is operable to further elevate the gangs, gauge wheels and shovels from the transport position to higher raised position to minimize damage to the crop at the end of the row by providing a greater clearance between the earth working shovels and the crop.

In addition to the foregoing advantages the power lift units of this invention have individually adjustable members for each gang whereby the raised position of each gang may be changed. The power lift units are also versatile in use of they are readily adapted to the majority of lines of the rear mounted cultivators being manufactured or in use.

IN THE DRAWING

FIGURE 1 is a rear elevational view of a six row rear mounted cultivator equipped with the selective power lift units of this invention;

FIGURE 2 is an enlarged plan view of a lift frame and hydraulic motor attached to the tool bar with the gangs and earth working tools omitted;

FIGURE 3 is an end elevational view partly in section of the cultivator showing a gang in the lowered position carrying a tool in earth working position; and FIGURE 4 is a view similar to FIGURE 3 showing the gang in the raised position.

Referring to the drawing there is shown in FIGURE 1 a farm tractor indicated generally at 10 connected to a rear mounted earth working implement shown as a row crop cultivator 11. Tractor 10 has a three point hitch comprising lift arms 12 and 13 and a horizontal draft frame 14 secured to the cultivator 11. In use, the hydraulic system of the tractor is used to raise and lower lift arms 12 and 13 and thereby raise the cultivator to the transport position and lower the cultivator to the earth working position.

Rear mounted cultivator 11 has a heavy transverse tool bar 16 projected an equal distance in opposite lateral directions from the tractor hitch. Tool bar 16 has a square cross-sectional shape and is secured at its mid-section to lift arms 12 and 13 and draft frame 14. Positioned below and rearwardly of tool bar 16 are a plurality of spaced gangs 17, comprising tubular members having angularly disposed rear end sections. A pair of gangs are used to support earth working tools 18 operative to cultivate the ground between adjacent rows of the crop. Each gang extends in a generally longitudinal direction and is used to support one or more earth working tools 18. Each tool 18 has an upright standard 19 adjustably secured to the gang. The lower end of the standard carries a shovel 21 as a sweep or spade.

A parallel linkage indicated generally at 22 pivotally connects each gang to the tool bar 16. Each parallel linkage 22 as well as each gang 17 is substantially identical in construction. As shown in FIGURE 3, linkage 22 comprises an upright plate 23 held into engagement with the back side of the tool bar 16 by a pair of bolts 24 which project through a block 26 located on the forward side of the tool bar 16. Nuts 25 threaded onto the end of bolts 24 clamp the plate 23 to the tool bar. Projected rearwardly from the plate 23 is an upper link 27 and a lower link 28. Pivot pin 29 pivotally connects the forward end of link 27 to the top of plate 23. Pivot pin 31 pivotally connects the forward end of bottom link 28 to the lower end of the plate 23. A pair of upright plate members 32 located on opposite sides of the rear end sections of links 27 and 28 are secured at their lower ends to the forward end of the tubular gang 17 by welds or the like. The upper ends of plate members 32 are pivotally connected by pivot pin 33 to the rear end of link 27. A pivot pin 34 pivotally connects the lower section of the plate members 32 to the lower link 28.

Lower link 28 has an end section 36 projected rearwardly in the plane of the tubular gang member 17. End section 36 terminates in an upright sleeve 38 carrying an adjustable screw 39. The lower end of screw 39 engages the top of the tubular gang 17 and is used to adjust the working depth of the shovels 21. Mounted on the forward end of the tubular gang member 17 is a gauge wheel assembly 41 operative to provide uniform depth control of the earth working tools 18 mounted on the same tubular gang 17.

Separate lift units indicated generally at 42 and 43 are used to selectively raise opposite sections or left and right sections of the gangs and their corresponding of the earth working tools. As shown in FIGURE 1, the left half of earth working tools 18 is in a raised position by the action of lift unit 42 while the right one half of the earth working tools 18 is in ground working position. The lift units 42 and 43 are identical in construction and are operated by the hydraulic system of the tractor. The structure of lift unit 43 which corresponds to identical structure of lift unit 42 is identified with the same reference numeral having the suffix A.

As shown in FIGURE 2, a transversely disposed frame 44 projected rearwardly from the tool bar 16 over the tool supporting gangs 17 is pivotally mounted on the left half of the tool bar 16. Frame 44 has an elongated transverse base beam 46 secured to three forwardly projected legs 47, 48 and 49. The rear ends of the legs 47 and 48 are secured to the opposite ends of the base 46. Leg 48 is secured to the mid-section of base 46. The forward ends of the legs 47, 48 and 49 are located adjacent right angle brackets 51, 52 and 53, respectively, secured to the rear side of the tool bar 16 by means of bolts 54 secured to the upper and lower sides of the tool bar. The bolts 54 project through one of the flanges of brackets 51, 52 and 53. Nuts 55 threaded on the ends of the bolts 54 secure the brackets 51, 52 and 53 to the tool bar 16. The legs 47, 48 and 49 are pivotally mounted on the brackets 51, 52 and 53 by transverse pivot bolts 56 projected through suitable holes in the forward ends of the legs and the rearwardly projected flanges of the brackets. Frame 44 pivots about the pivot pins 56 to a raised position as shown on the left section in FIGURE 1 and a lowered position as shown on the right section. Right frame 44A is identical to left frame 44.

The elongated base beam 46 is reinforced with an elongated rod 57 secured to the opposite ends of the base 46 and to an upright strut 58 connected to the mid-section of the rod 57 and the middle of the base 46.

Frame 44 is used to raise and lower the tool carrying gangs 17 independently of the action of the lift arms 12 and 13 of the tractor. This can be accomplished without changing the elevation of the tool bar 16. Each gang 17 is attached to the base 46 by separate connecting members 59, such as link chains, cables or a similar flexible member, which do not interfere with the working action of the gangs 17 when they are in ground working position as shown in the right section of the cultivator. Each of the connecting members 59 is attached to the forward section of the gang 17 by upright ears 61 secured to the tubular gangs. A plurality of arms 62 having key hole slots 63 are secured to the lower side of the base beam 46. The arms 62 are in substantial alignment with the ears 61. In use, a chain is threaded through the key hole slot and is adjusted to a selected length to adjust the raised position of each gang.

Frame 44 together with the tool supporting gangs 17 are moved to an elevated raised position by a power means indicated generally at 64 operable with the use of the hydraulic system of tractor 10. The power means 64 comprises an elongated cylinder 66 carrying a piston 67. Cylinder 66 has a cylindrical base 68 located adjacent the lower end of an upright support 69. Support 69 has a forwardly projected flange 70 carrying a pin or stud 71 and a similar transverse pin in the opposite flange cooperating with pin 71 to pivotally mount the lower end of the cylinder 66 on upright support 69. The upper end of the support 69 bears against the tool bar 16 and is secured thereto by bolts 72 and 73 secured to the support and located on opposite sides of the tool bar. Bolts 72 and 73 project through a plate 74 extended across the opposite side of the tool bar. Nuts 76 threaded on the end of the bolts 72 and 73 clamp support 69 and plate 74 to tool bar 16. As shown in FIGURE 2, the piston rod 67 is pivotally attached to the mid-section of base beam 46. The outer end of the rod 67 is located between a pair of forwardly projected plates 77 and 78 secured to the mid-section of base beam 46. A pivot bolt 79 projects through the plates 77 and 78 and the end of the piston rod 67.

The base end of cylinder 66 is coupled to a fluid line 81, as a flexible hose, connected to a transverse pipe 82 secured to the top of the tool bar 16. The inner end of the pipe 82 is connected to a hose 83 which leads to a valve assembly 84 located on the tractor. Valve assembly 84 has three actuator levers 86 which are used to selectively supply hydraulic fluid under pressure to the power means 64 and 64a so as to raise either the right section of the cultivator or the left section of the cultivator. Two of the actuator levers are movable to a position to simultaneously supply fluid under pressure to both power means 64 and 64a whereby all of the gangs and their associated earth working tools are raised from the earth working position without changing the position of the tool bar 16.

In use, the rear mounted cultivator 11 is used to till the soil 88 between the rows of plants 87. Tractor 10 is driven down the rows of plants 87, as corn, millet, cotton, soybeans and the like, to align the earth working tools 18 and the strips of soil 88 located between the plants. The entire tool bar 16 is lowered by lowering the lift links 12 and 13. In this manner each gang 17 is lowered until the gauge wheel assembly 41 on each gang engages the surface of the ground. In this position the earth working shovels 21 are below the surface of the ground 88 and function to till the ground. To raise either the right or left section of the cultivator to avoid grass waterways or the like one of the actuator levers 86 is moved to the open position allowing hydraulic fluid under pressure to flow to the selected power means 64 or 64a. The hydraulic fluid under pressure will force the piston rod in an upward and outward direction pivoting the frame 44 upwardly about the pivot pins 56. The chain members 59 being connected to the transverse base beam 46 and each of the gangs 17 raise the gangs 17 moving the shovels 21 to a raised position above the surface of the ground 88. As soon as the waterway has been crossed the actuator lever 86 is moved to the return flow position allowing the fluid in the cylinder 66 to flow back into the reservoir in the tractor. Piston rod 67 retreats back into cylinder 66 lowering frame 44 so as to return shovels 21 to ground working positions.

The power means 64 and 64a can be actuated to move the gangs 17 in an upward direction when the tool bar 16 is in the lowered position or in the raised or transport position. When the plants 87 have reached a height where they are engaged by the cultivator shovels 21 when the tractor is being turned around at the end of the row the plants are normally cut and broken by the shovels 21. To eliminate this damage the shovels 21 can be further raised by the action of the power means 64 and 64a. With the application of fluid under pressure to the power means 64 and 64a both frames 44 and 44a are further elevated raising all of the gangs 17 as shown in FIGURE 4.

While there have been shown and described the preferred embodiment of the invention it is understood that various changes and omissions can be made by one skilled in the art without departing from the spirit of the invention. For example, support 69 for the power means 64 may project upwardly from the top of the tool bar 16 locating the forward end of the power means 64 above the tool bar 16. With the application of fluid pressure to the rod end of the cylinder frame 44 would be elevated to the position shown in FIGURE 4.

I claim:
1. In combination: a tractor having lift arms and first fluid power means operable to raise and lower the lift arms, a single generally horizontal tool bar connected to the lift arms and movable to selectively raised or lowered positions with the first fluid power means, a plurality of gangs positioned below and rearwardly of the tool bar, earth working tools secured to said gangs, pivot means mounting each gang on the tool bar at selected locations along the tool bar, each of said pivot means including a member engageable with a gang to limit downward movement of the gang so that the elevation of the tool bar determines the working depth of the earth working tools and when the tool bar is in the raised position, the working tools are out of the soil, said pivot means including an upright plate secured to the tool bar, a pair of spaced substantially parallel links pivotally connected to said plate, and an upright arm pivotally connected to rear sections of the links and secured to the gang, said member engageable with the gang being adjustably mounted on the lower link and engageable with the top of the associated gang whereby the working depth of the earth working tools can be adjusted, auxiliary lift assemblies for selectively raising the gangs independently of the elevation of the tool bar comprising first frame means pivotally attached to said tool bar and projected rearwardly from the tool bar, connecting means attached to the first frame means and at least one of the gangs and second fluid power means connected to the first frame means and the tool bar operable to selectively raise and lower said first frame means thereby independently raise and lower said one of the gangs and the associated earth working tools and second frame means pivotally attached to said tool bar and projected rearwardly from the tool bar, connecting means attached to the second frame means and other gangs and third fluid power means connected to the second frame means and the tool bar operable to selectively raise and lower said second frame means thereby independently raise and lower said other gangs and associated earth working tools and fluid control means mounted on the tractor to selectively control the flow of fluid to the second and third fluid power means to selectively raise either said one of the gangs or said other gangs and to selectively raise all of the gangs independently of the elevation of the tool bar.

2. The earth working implement defined in claim 1 wherein each of said connecting means are adjustable length flexible links connected to each gang.

3. The earth working implement defined in claim 1 wherein said first and second frame means each includes a transverse base beam located above the gangs and a plurality of forwardly projected legs secured to the beam and pivot means connecting each leg to the tool bar.

4. The earth working implement defined in claim 3 wherein said second fluid power means is connected to a center portion of one base beam and the third fluid power means is connected to a center portion of the other base beam.

5. The earth working implement defined in claim 4 wherein said second and third fluid power means are hydraulic piston and cylinder assemblies connected to the hydraulic system of the tractor by the fluid control means.

6. The earth working implement defined in claim 1 wherein said second and third fluid power means are hydraulic piston and cylinder assemblies and including conduit means coupling the piston and cylinder assemblies to the fluid control means comprising a valve unit mounted on the tractor whereby hydraulic fluid under pressure can be selectively supplied to the piston and cylinder assemblies.

References Cited

UNITED STATES PATENTS 2,593,176    4/1952    Patterson _____ 172—739 X
2,859,577   11/1958    Presler _____ 172—740 X ROBERT E. BAGWILL, Primary Examiner A. E. KOPECKI, Assistant Examiner U.S. Cl. X.R.

172—448, 484, 491, 739